Jan. 19, 1960

M. P. WINTHER 2,921,657

MAGNETIC POWDER CLUTCH WITH VARIABLE GAP

Filed Jan. 27, 1955

INVENTOR.
MARTIN P. WINTHER
BY
ATTORNEYS

United States Patent Office 2,921,657
Patented Jan. 19, 1960

2,921,657

MAGNETIC POWDER CLUTCH WITH VARIABLE GAP

Martin P. Winther, Gates Mills, Ohio, assignor to Eaton Manufacturing Company, Cleveland, Ohio, a corporation of Ohio Application January 27, 1955, Serial No. 484,435

5 Claims. (Cl. 192—21.5)

This invention relates to an electromagnetic clutch apparatus and more particularly to novel features of such an apparatus facilitating quick or rapid disengagement of the clutch.

Broadly the present invention comprehends the provision of a pair of members of a magnetic powder clutch having complementary adjacent surfaces shaped to diminish the air gap between the members in response to energization of the clutch and to increase the air gap therebetween after deenergization to effect a rapid disengagement between the clutch members due to disruption of a mechanical bond between the members caused by packing of the powder therebetween.

In the past, efforts have been directed towards perfecting the electromagnetic powder clutch as an operating mechanism particularly as to its adaptability in automatic automotive transmissions. For such service the matter of instantaneous release and practical absence of drag when de-energized is not a critical property, it being only necessary to avoid creep in the automobile when standing with the engine idling to be entirely acceptable for automatic transmission service.

It has, however, been experienced with magnetic powder clutches of the type having a pair of relatively rotatable members with a magnetic powder located therebetween for providing a bond that after a period of operation of the clutch under full excitation and without slippage between members, an undesirable packing or caking of the powder took place causing a bond between members after deenergization of the clutch. It appears from data gathered through careful tests that the time required for such a clutch to release is on the order of three or four times the length of time required for the decay of flux in the clutch indicating a mechanical interference in the gap where the magnetic powder lies. This property renders the present magnetic powder clutches employed for service in manual shifting transmissions somewhat undesirable, especially on cars employing larger engines.

As a means of obviating the above mentioned difficulties, it has been conceived to incorporate in a magnetic powder clutch, provisions for removing the support from one side of the packed or caked powder upon deenergization of the clutch coil. In accomplishing this objective, a bipartite input member having an annular recess therein for receiving a relatively rotatable output member is provided. The adjacent opposed faces of the input member are divergent in one axial direction and the opposed faces of the complementary output member are also divergent in the same axial direction so that relative axial movement of the members increases or decreases the radial spacing or gap between the members. Provisions is also made for automatically decreasing the gap between members in response to clutch coil energization and for increasing the gap upon deenergization by providing resilient, bendable supporting members for the output member to facilitate the axial movements described. Magnetic attraction draws the output member into whereas the resiliency of the member acts to release it from the recess of the input member.

Another feature of the present invention is the provision of rotatable clutch members with a reduced moment of inertia to effect a more responsive clutch coupling. This is accomplished by the use of four series gaps interposed in the magnetic circuit of the clutch enabling the use of lighter clutch members. An increased number of air gaps necessitates an increased magnetomotive force with a consequent increased use of copper, but the weight added thereby is more than compensated for by the reduced weight of iron employed with the advantageous results above mentioned.

It is accordingly an object of the present invention to provide a clutch of the magnetic powder type that facilitates a quick and rapid disengagement of the clutch members in response to deenergization of the clutch coil.

It is a further object of the present invention to provide a pair of cooperable clutch members shaped and disposed to vary the spacing therebetween in response to relative axial movement thereof.

It is a further object of the present invention to provide a resilient, yieldable support for a clutch member of an electromagnetic clutch to facilitate axial movement of said member.

It is a further object of the present invention to provide an electromagnetic clutch apparatus having four gaps in the magnetic circuit facilitating clutch members with a relatively low moment of inertia.

Other objects and advantages of the present invention will appear from a perusal of the following detailed description when considered with the accompanying drawings in which.

Figure 1:
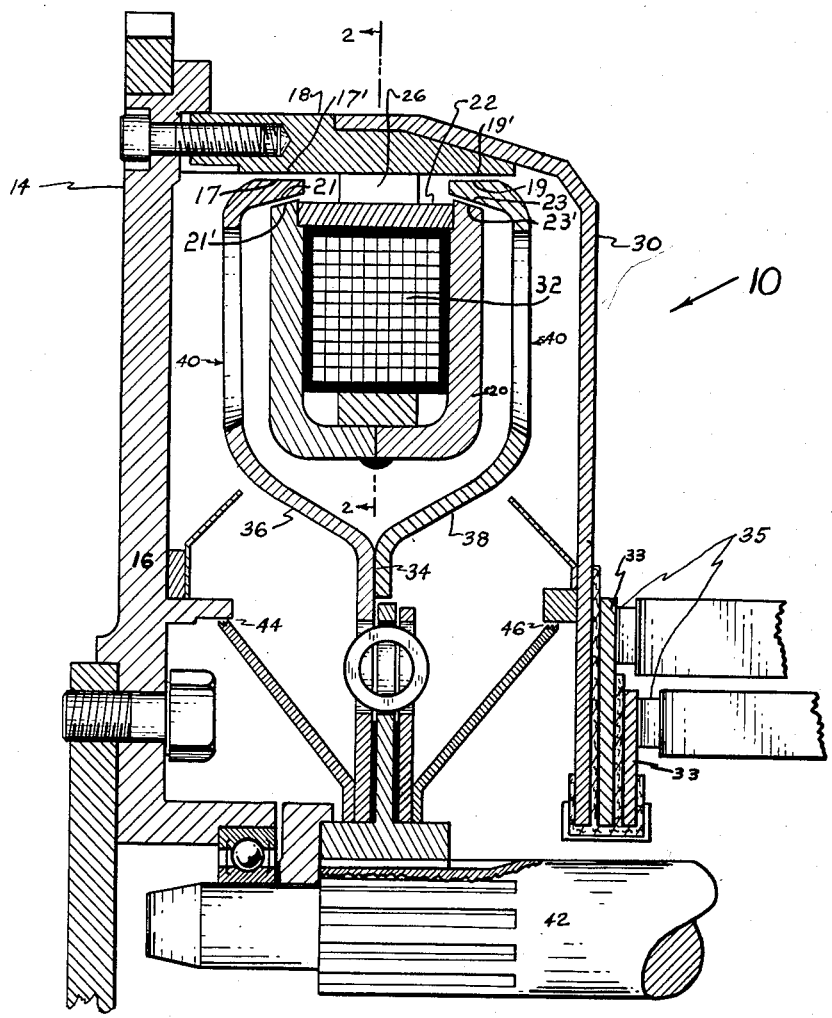
Fig. 1 depicts in cross section a clutch apparatus embodying the present invention.
Figure 2:
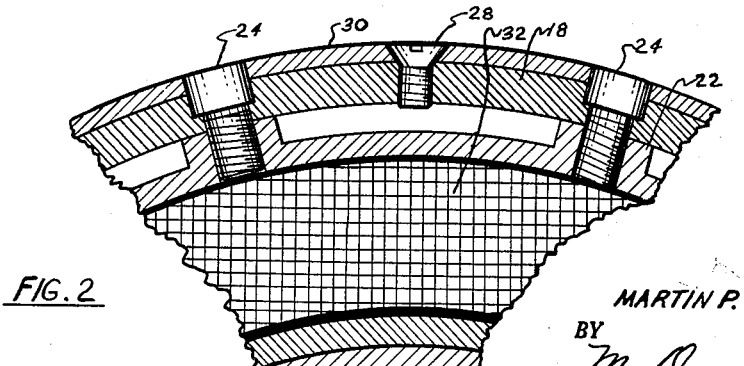
Fig. 2 is a sectional view taken along 2—2 of Fg. 1.

Referring now more particularly to Fig. 1 of the drawing for a more detailed description of the invention, 10 represents generally a cross-sectional view of the clutch apparatus having a rotatable input member 14 coupled to a power source (not shown) by some suitable means and having a cylindrical support section 16, annular pole section 18 fixedly attached to the support section by some suitable means and a further cylindrical U-shaped pole section 20 having its ends spaced radially from section 18. Member 20 is held in position by a suitable attachment to a non-magnetic ring 22 which is bolted in position by bolts 24 extending radially through portion 18 and a raised portion of ring 22. (See Fig. 2.) Input member 14 has secured thereto by bolts 28 an enclosure 30 which along with member 14 provides a housing for the clutch components.

A coil 32 disposed between members 20 and 22 is provided for producing the necessary magnetic field and is excited through suitable connections including a pair of slip rings 33 and a pair of brushes 35.

An output member 34 being Y or claw-shaped and having a pair of divergent portions 36 and 38 partially enclosing pole section 20 is provided and has the claws or ends of portions 36 and 38 interposed between portion 18 and respective complementary ends of pole section 20. Output member 34 is splined to a suitable shaft 42 for rotation therewith through a suitable means. The clawed portions 36 and 38 are reduced in weight by holes 40 for the purpose of reducing the moment of inertia of these members. According to a feature of the invention, the ends of portions 36 and 38 and the ends of complementary pole section 20 are shaped to allow a decrease or increase of the gap between them with relative axial movement between the members. Portions 36 and 38 are wedge shaped or convergent at the ends with the upper portion of each having a face substantially parallel to portion 18 and forming therewith complementary spaced surfaces 17, 17' and 19, 19'. The lower portion of the wedge shaped ends of 36 and 38 form a small acute angle of preferably 15° with the upper face. The ends of pole section 20 are shaped to be substantially parallel to the lower face mentioned and along with the lower face define complementary spaced surfaces 21, 21' and 23, 23'.

The space between the clutch members is provided with a suitable magnetic powder material for producing a bond between members in a well-known manner.

For retaining the magnetic powder within the clutch confines, a pair of magnetic seals 44, 46 are provided at a point radially intermediate the axis and outer periphery of the clutch. A magnetic portion and a threaded portion of the seal cooperate to respectively, magnetically entrain to prevent escape and to screw back into the clutch housing, particles of magnetic material.

The portions 36 and 38 of output member 34 are resilient and are readily responsive to magnetic attraction produced by coil 32 to deflect axially toward each other to effect a reduction in the gap between the clutch members. Simultaneously therewith and also responsive to magnetic attraction, the magnetic powder assumes a position between the pole faces to provide a bond therebetween in a manner well known.

Upon deenergization of coil 32, the claw portions, because of their resiliency, act to return to their normal inoperative position from magnetic influence and move axially away from each other to increase the gap between pole faces and consequently to disrupt and remove the support for any packed magnetic powder between the members. Accordingly, the magnetic powder bond is readily loosened and removed from the space between pole members and the powder falls into the storage spaces within the clutch as a result of centrifugal force.

As previously pointed out, the output member 34 is made as light as feasibly may be done to reduce the moment of inertia thereof. The purpose for such a design is to effect good shifting with quick response of the clutch member.

Figure 3:
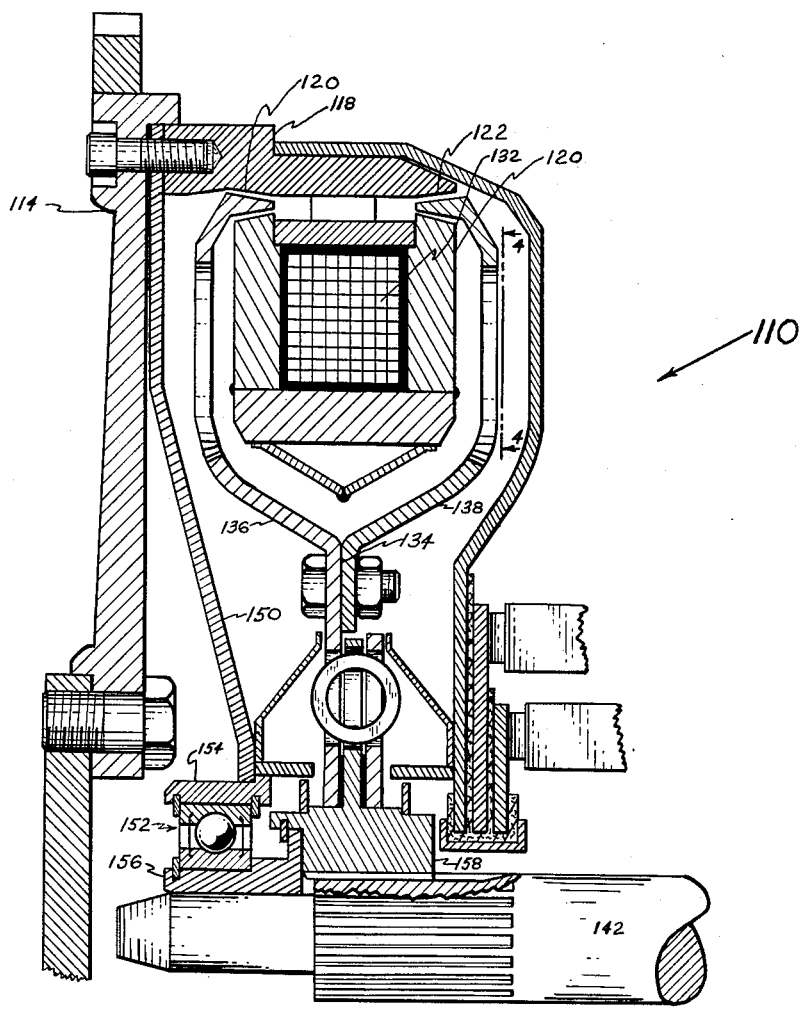
Fig. 3 depicts in cross section a clutch apparatus embodying the present invention in a modified form.
Figure 4:
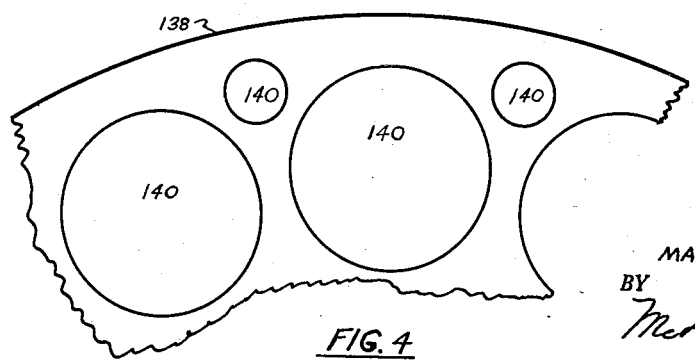
Fig. 4 is a sectional view taken along 4—4 in Fig. 3.

In accordance with a modification of the invention, Fig. 3 illustrates a clutch apparatus similar in many respects to that already described but having additional provision for reducing the gap between clutch pole members and having an arrangement to hold the clutch drum in axial alignment.

In the Fig. 3 clutch, an input member 114 is provided having an annular portion 118 arranged similarly to portion 18 of Fig. 1 but having tapered portions 120, 122. A Y or claw-shaped output member 134 is provided having portions 136 and 138 terminating in a pair of wedge-shaped claws, having inner and outer faces divergent with respect to a line parallel to the clutch axis. Within output member 134 is a pole section 120 of generally U-shape having its ends adjacent to and substantially parallel with the inner faces of the claws of member 34. The outer faces of claws are substantially parallel with portions 120, 122, respectively. The opposed faces of the claws are preferably divergent at approximately 20 degrees, each being divergent 10° with respect to the clutch axis.

In a manner similar to the clutch shown in Fig. 1, the members 136 and 138 are resilient and by solenoid action are responsive to magnetic attraction to move axially inwardly in the recess of input member 114 to perform the functions stated with respect to the claws of Fig. 1.

As an additional feature of the clutch shown in Fig. 3, means are provided for maintaining the input and output members of the clutch in axial alignment irrespective of the presence of an output shaft 142. A generally disc-shaped member 150 secured by bolts at its outer periphery to input member 114 extends inwardly to and supports bearing 152 having an outer race 154 and an inner race 156. Disc 150 also provides support for output member 134 by connection between inner race 156 and a ring 158 which carries output member 134. Ring 158 is grooved axially along its inner surface to receive splined shaft 142 for driving engagement therewith.

The clutch members shown in Fig. 3 including the input and output members and elements associated therewith may be assembled as a unit and be readily introduced into or removed from a power train by insertion of a shaft 142 into the spline in ring 148 and a connection to input member 114, no other attachments or connections being required.

Figure 5:
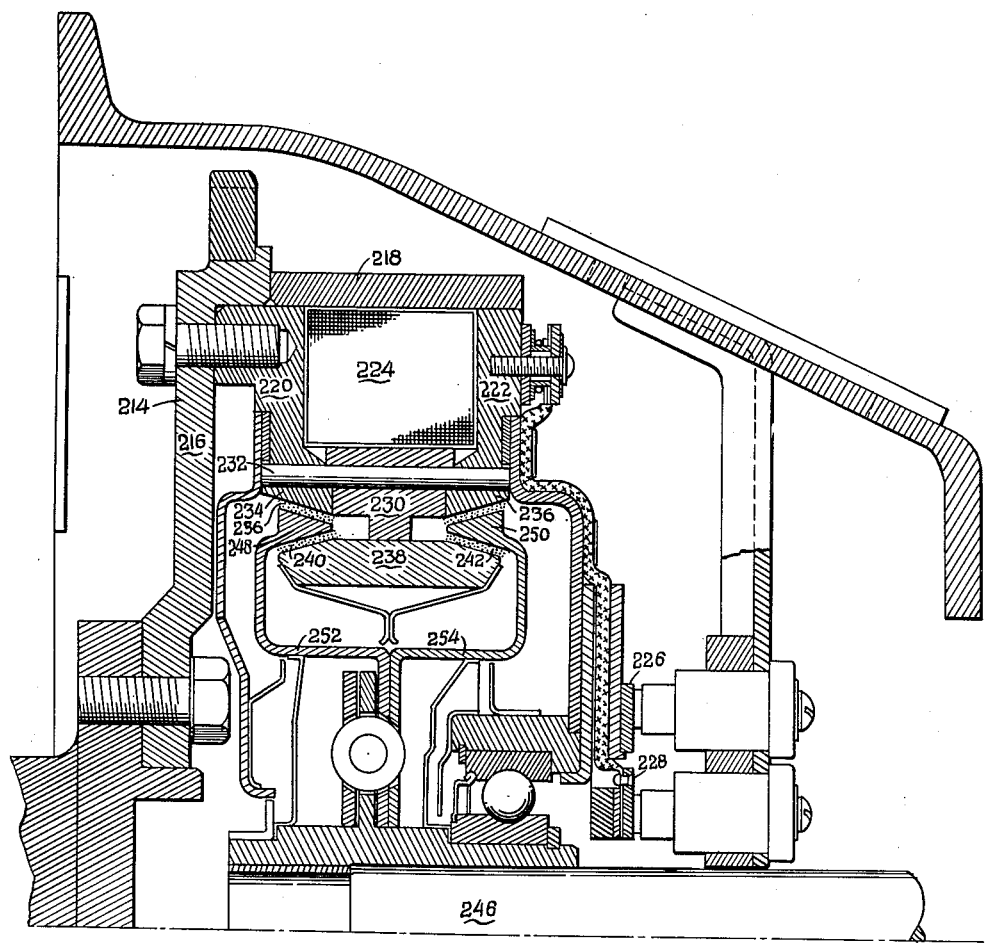
Fig. 5 depicts in cross section a clutch apparatus embodying the present invention in a further modified form.

Fig. 5 discloses a clutch structure at variance with the structures of Figs. 1 through 4 primarily as relates to the positioning and arrangement of the clutch coil externally rather than internally of the claw-type output members thereof. As such, coil 224 is arranged centrally between discs 220 and 222 with ring arranged radially, outwardly thereof. Disc 220 is fixedly secured to flywheel 216 of input member 214 providing for the rotation of coil 224 therewith.

Inwardly, radially spaced from coil 224 is a non-magnetic ring 230 having a non-magnetic pin 232 extending axially therethrough. Discs 220 and 222 terminate, respectively, in a pair of pole faces 234, 236 which are varyingly, radially spaced from the clutch axis along their lengths. A further pole member 238 having a pair of pole faces 240, 242, each being divergent to the clutch axis, is rotatable with the clutch input member through the attachment thereof to ring 230 by appropriate rivets or the like, not shown.

An output shaft 246 is provided for the clutch and carried thereby are a pair of claw-type output members 248, 250 extending between pole faces 234, 240 and 236, 242. Claws 248, 250 are carried by respective resilient and bendable arms 252 and 254 that are rigidly secured to the clutch output shaft in some suitable manner.

The opposed faces of claws 248 and 250 are divergent from the clutch axis and from each other and each is substantially parallel to the adjacent pole face of the clutch input member.

Magnetic flux produced by coil 224 tends to flow in a closed path about the coil and traverses portion 218, discs 220 and 222, pole faces 234 and 236, claws 248 and 250, pole 238 and the air gaps between the pole faces mentioned.

Opposed faces of the claws each assume an angle of approximately 15° with respect to the clutch axis and therefore 30° with respect to each other. In a manner similar to the clutches above described, claws 248 and 250 are responsive to magnetization to move axially toward each other to effect a diminution of the gaps between the claws and each of the opposed poles rotatable with input member 214 and the arms 244 and 246 are resilient to effect an axial separation of the claws upon deenergization of coil 224. A suitable magnetic powder material 256 for providing a bond between clutch members is provided in the gap between the members.

Having set forth the structure of Fig. 5 that is basically and materially different from other embodiments of the invention, the similar features will not be set forth in detail.

It is to be understood that the operation of the clutch shown in Fig. 5 is analagous to the operation of clutches shown in Figs. 1 through 4. In response to energization of coil 224, magnetic flux is concentrated in the gap between the clutch poles including claws 248 and 250 and entrains magnetic material to provide a bond between the members in a well-known manner. Simultaneously therewith and according to a feature of this invention, claws 248 and 250 are drawn axially toward each other to decrease the radial gap spacing between the members and consequently increase the flux concentration between the members. After a period of operation of the clutch and when it is desired to disengage or release the same, coil 224 is deenergized to allow the resiliency of arms 252 and 254 to axially separate claws 248 and 250 and withdraw the same to some extent from the recess. In a manner already described, withdrawal of claws 248 and 250 allows any magnetic material packed between the clutch members to disrupt and fall away from the gap into the powder storage space.

Arms 252 and 254 are of light construction to provide the desirable resiliency and low moment of inertia thereto.

While the present invention has been described and illustrated with respect to certain specific embodiments thereof, it is obvious that various changes and modifications may be made without departing from the spirit or scope of the invention and it is intended that all matter contained in the above description or shown in the accompanying drawings shall be interpreted as illustrative and not in a limiting sense.

What I claim is:

1. A magnetic clutch having a pair of relatively rotatable members separated by a gap, magnetic material located in said gap, means providing a magnetic field linking said members and traversing said gap, at least one of the surfaces of adjacent opposed surfaces of said members being disposed at an acute angle with respect to a line parallel to the axis of rotation of said members and the complementary surface on the other of said members being disposed substantially parallel to said first mentioned surface, one of said members having resilient portions integral therewith and supporting said surfaces of said one member and being resiliently axially movable in response to said magnetic field, whereby the gap between said members is varied in accordance with the magnetic force produced by said field producing means.

2. A magnetic clutch having a rotatable input member and a relatively rotatable output member, means producing a magnetic field linking said members, one of said members having an annular recess intermediate its radial length, a portion of said other member being rotatable in said recess, magnetic material located between said members, one of the radially opposed surfaces of said recess being disposed at an acute angle with respect to the other surface of said recess, the surfaces of the portion of said other member adjacent and opposed to the surfaces of said recess being substantially parallel to the respective surfaces thereof, and a resilient, bendable supporting means for the other of said members responsive to magnetization of said clutch to vary the axial spacing of said members to provide an effective disruption of the mechanical bond due to packing of said powder when the clutch is de-magnetized.

3. In a magnetic clutch comprising a pair of relatively rotatable members, means producing a magnetic field linking said members, magnetic material located between said members and being responsive to said field to provide a bond between said members, one of said members having an axial annular recess therein intermediate its radial width, the other of said members having a portion thereof located in said recess, one of the surfaces of said recess being conical along a portion thereof and the surfaces of the portion of said other member located in said recess adjacent to the surfaces of said recess being substantially parallel to the surfaces of said recess, a resilient support means formed integral with and supporting said portion of said other of said members located in said recess whereby the gap between said members is varied due to relative axial movement between said members in response to magnetic influences.

4. In a magnetic clutch comprising a pair of relatively rotatable members, means producing a magnetic field linking said members, magnetic material located between said members, one of said members having a pair of axially opposed, annular recesses disposed intermediate its radial width, said other member having a pair of complementary portions disposed in said respective recesses, each of said recesses having convergent radially opposed surfaces, each of said complementary portions having radially opposed surfaces substantially parallel to respective adjacent surfaces of said recess and resilient support means for said other member to allow axial movement of said complementary portions in response to said magnetic field whereby packing of said magnetic material is readily disrupted upon extinction of said magnetic field.

5. A magnetic clutch having a pair of relatively rotatable members, means selectively producing a magnetic field for linking said members, a pair of radially spaced separate magnetically permeable elements rotatable with one of said members, the other of said members having spaced elements located between but spaced from said spaced magnetic elements, said members having pairs of coincident surfaces thereon, magnetic material located between said surfaces, at least one pair of surfaces of the adjacent opposed surfaces of said elements being disposed at an acute angle with respect to the axis of rotation of said members and resilient supporting means integral with said spaced elements of said other member enabling axial movement of said spaced elements in response to said magnetic field, whereby the gap between said members is varied in accordance with the magnetic force produced by said field producing means.

References Cited in the file of this patent

UNITED STATES PATENTS

| | | |
|---|---|---|
| 1,137,804 | Sperry | May 4, 1915 |
| 2,575,360 | Rabinow | Nov. 20, 1951 |
| 2,629,471 | Rabinow | Feb. 24, 1953 |
| 2,690,241 | Bachman | Sept. 28, 1954 |
| 2,693,261 | Winther | Nov. 2, 1954 |
| 2,772,762 | Gamundi et al. | Dec. 4, 1956 |